United States Patent
Krupka

(10) Patent No.: US 7,813,457 B2
(45) Date of Patent: Oct. 12, 2010

(54) DEVICE, SYSTEM AND METHOD FOR DETECTING AND HANDLING CO-CHANNEL INTERFERENCE

(75) Inventor: Eyal Krupka, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 1730 days.

(21) Appl. No.: 10/745,535

(22) Filed: Dec. 29, 2003

(65) Prior Publication Data
US 2005/0141466 A1  Jun. 30, 2005

(51) Int. Cl.
H03D 1/04  (2006.01)

(52) U.S. Cl. .................. 375/346; 375/267; 375/260; 375/148; 375/347; 375/340; 455/63.1; 455/296

(58) Field of Classification Search .......... 375/144, 375/148, 346, 340, 142, 343, 150, 267, 260, 375/347; 455/63.1, 296, 63.13; 708/5, 422, 708/813
See application file for complete search history.

(56) References Cited

U.S. PATENT DOCUMENTS

| | | | |
|---|---|---|---|
| 6,256,486 B1 * | 7/2001 | Barany et al. ............... | 455/296 |
| 6,512,737 B1 * | 1/2003 | Agee .......................... | 370/208 |
| 6,714,609 B1 * | 3/2004 | Keisala ....................... | 375/349 |
| 7,010,069 B2 * | 3/2006 | Chugg et al. ................ | 375/346 |
| 7,034,769 B2 * | 4/2006 | Surducan et al. ............ | 343/793 |
| 7,269,238 B2 * | 9/2007 | Lee et al. .................... | 375/346 |
| 2002/0057735 A1 * | 5/2002 | Piirainen .................... | 375/229 |

OTHER PUBLICATIONS

Loncar et .al "Co-channel interference mitigation on GSM networks by iterative estimation of channel and data", Telecommunications Research Center Vienna; received on Mar. 19, 2002, pp. 1-8.*

* cited by examiner

Primary Examiner—David C Payne
Assistant Examiner—Rahel Guarino
(74) Attorney, Agent, or Firm—Pearl Cohen Zedek Latzer, LLP

(57) ABSTRACT

Briefly, some embodiments of the invention may provide devices, systems and methods to estimate, detect and handle cross-correlation between co-channel interference and a received signal in a wireless communication network. For example, a method in accordance with an embodiment of the invention may handle a data block of a received signal based on an estimated cross-correlation between co-channel interference and the received signal.

20 Claims, 3 Drawing Sheets

DEVICE, SYSTEM AND METHOD FOR DETECTING AND HANDLING CO-CHANNEL INTERFERENCE

BACKGROUND OF THE INVENTION

In the field of wireless communications, a first wireless communication station may transmit a first signal to a second wireless communication station. The first signal may include a training sequence, e.g., a sequence of symbols known to both the first and second wireless communication stations. The training sequence may be used by the second wireless communication station, for example, for channel estimation, time tracking, or Carrier to Interference Ratio (CIR) estimation.

During the transmission of the first signal, a third wireless communication station may transmit a second signal, thus creating co-channel interference. The co-channel interference may result in various problems, for example, errors by the second wireless communication station in estimating a channel, errors in estimating a noise variance, reduction in the performance of time tracking and channel length estimation algorithms, errors in calculating and normalizing "soft bits", or a reduction in a probability of successfully decoding or processing a data block.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
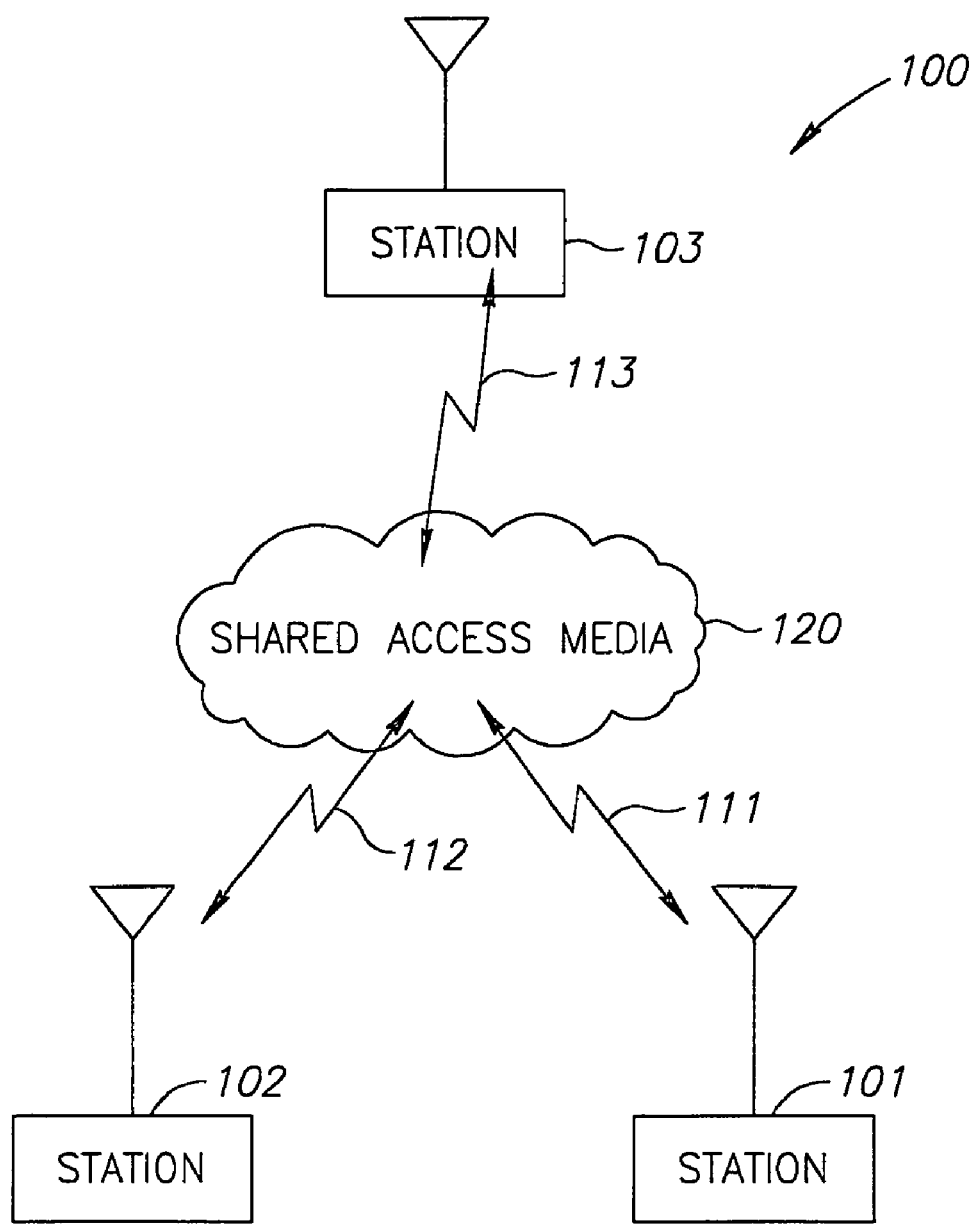
FIG. 1 is a schematic block diagram illustration of a wireless communication system including one or more wireless communication stations able to detect and/or handle cross-correlation between co-channel interference and a signal, in accordance with exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a transmitter, a receiver, a transceiver, a transmitter-receiver, a wireless communication station and/or a wireless communication device. Wireless communication devices intended to be included within the scope of the invention include, by way of example only, a cellular radio-telephone communication systems, a cellular telephone, a wireless telephone, a Personal Communication Systems (PCS) device, a Portable Digital Assistant (PDA) device which incorporates a wireless communication device, or the like.

By way of example, types of cellular radio-telephone communication systems intended to be within the scope of the invention include, although not limited to, Direct Sequence-Code Division Multiple Access (DS-CDMA) cellular radio-telephone communication systems, Global System for Mobile Communications (GSM) cellular radio-telephone systems, North American Digital Cellular (NADC) cellular radio-telephone systems, Time Division Multiple Access (TDMA) systems, Extended-TDMA (E-TDMA) cellular radio-telephone systems, Wideband CDMA (WCDMA) systems, General Packet Radio Service (GPRS) systems, Enhanced GPRS (EGPRS) systems, Enhanced Data for GSM Evolution (EDGE) systems, 3G systems, 3.5G systems, 4G systems, communication devices using various frequencies and/or range of frequencies for reception and/or transmission, communication devices using 2.4 Gigahertz frequency, communication devices using 5.2 Gigahertz frequency, communication devices using 24 Gigahertz frequency, communication devices using an Industrial Scientific Medical (ISM) band and/or several ISM bands, and other existing and/or future versions of the above. It is noted that embodiments of the invention may be used in various other apparatuses FIG. 1 schematically illustrates a block diagram of a wireless communication system 100 in accordance with exemplary embodiments of the invention, which may include one or more wireless communication stations, for example, wireless communications stations 101, 102 and 103. One or more of stations 101, 102 and 103 may be able to estimate, detect and/or handle cross-correlation between co-channel interference and a wireless signal in accordance with some embodiments of the invention, as described in detail below. It should be appreciated that cross-correlation between a first signal, e.g., co-channel interference and/or an interfering signal, and a second signal, e.g., a signal which may be intended and/or required to be received and/or processed, may be referred to herein as "CCI".

Stations 101, 102 and/or 103 may communicate among themselves over a shared wireless media 120, which may include, for example, wireless communication links 111, 112 and 113. For example, station 101 may communicate with one or more other stations of system 100 through link 111, station 102 may communicate with one or more other stations of system 100 through link 112, and station 103 may communicate with one or more other stations of system 100 through link 113.

In some embodiments, station 101 may transmit a first signal to station 103. During the transmission of the first signal by station 101, station 102 may transmit a second signal, thus creating co-channel interference. In one embodiment, for example, the transmission of a training sequence in the first signal and the transmission of a training sequence in the second signal may create CCI. In accordance with some embodiments of the invention, station 103 may detect and/or handle CCI, as detailed herein.

Figure 2:
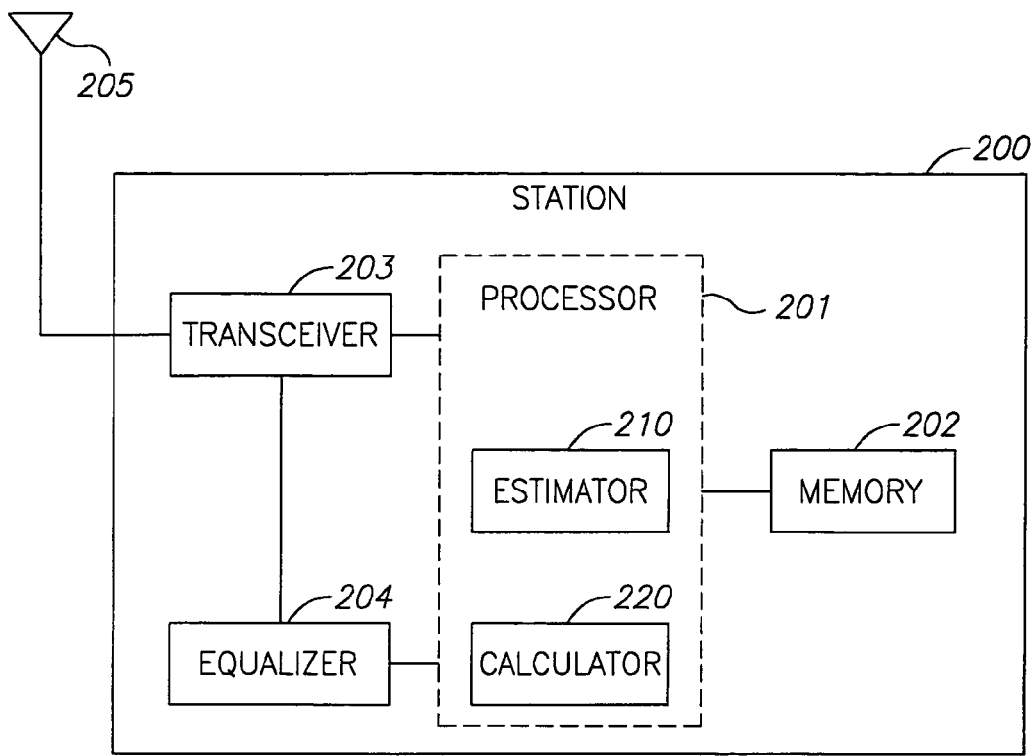
FIG. 2 is a schematic block diagram illustration of a station able to detect and/or handle cross-correlation between co-channel interference and a signal in accordance with exemplary embodiments of the invention.

FIG. 2 schematically illustrates a block diagram of a station 200 able to estimate, detect and/or handle CCI in accordance with exemplary embodiments of the invention. Station 200 may be, for example, an exemplary implementation of station 103 of FIG. 1 in accordance with some embodiments of the invention. Station 200 may include, for example, a processor 201, a memory unit 202, a transceiver 203, an equalizer 204, and an antenna 205. In some embodiments, station 200 may include an estimation unit or estimator 210, and/or a calculation unit or calculator 220. In one embodiment, estimator 210 and/or calculator 220 may be part of processor 201; in an alternate embodiment, estimator 210 and/or calculator 220 may be implemented using additional and/or alternate hardware components and/or software components.

Processor 201 may include, for example, a Central Processing Unit (CPU), a Digital Signal Processor (DSP), a microprocessor, a controller, a chip, a microchip, or any other suitable multi-purpose or specific processor. In some embodiments, processor 201 may include, for example, estimator 210 and/or calculator 220. Estimator 210 may include, for example, an estimation unit able to perform channel estimation and/or noise variance estimation. Calculator 220 may include, for example, a calculation unit able to perform calculation, estimation and/or detection of CCI, for example, as detailed herein.

Memory unit 202 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Transceiver 203 may include, for example, one or more units able to perform separate or integrated functions of sending and/or receiving wireless communication signals, blocks, frames, packets, messages and/or data. For example, transceiver 203 may include separate transmitter and receiver units, a single transceiver unit, or a single transmitter-receiver unit.

Equalizer 204 may include, for example, an equalizing circuit or circuitry able to remove distortion from a signal, to compensate for distortion of a signal, or to otherwise enhance and/or equalize a signal as is known in the art.

Antenna 205 may include an internal and/or external Radio Frequency (RF) antenna. In some embodiments, for example, antenna 205 may include a dipole antenna, a monopole antenna, an omni-directional antenna, an end fed antenna, a circularly polarized antenna, a micro-strip antenna, a diversity antenna, or any other type of antenna suitable for sending and receiving wireless communication signals, blocks, frames, packets, messages and/or data.

In some embodiments of the invention, station 200 may estimate, detect and/or handle CCI in a wireless communication network as described herein. For example, processor 201, estimator 210 and/or calculator 220 may estimate that a high CCI exists between transmissions received by station 200, for example, between transmissions of two other stations of the wireless communication network, and may handle one or more data blocks of received transmissions based on the estimated CCI. Processor 201, estimator 210 and/or calculator 220 may perform estimation operations, as well as detecting and/or handling operations, based on signals and/or data from transceiver 203 and/or equalizer 204. Memory unit 202 may store estimations, parameters, values and/or data used and/or calculated in accordance with some embodiments of the invention.

Figure 3:
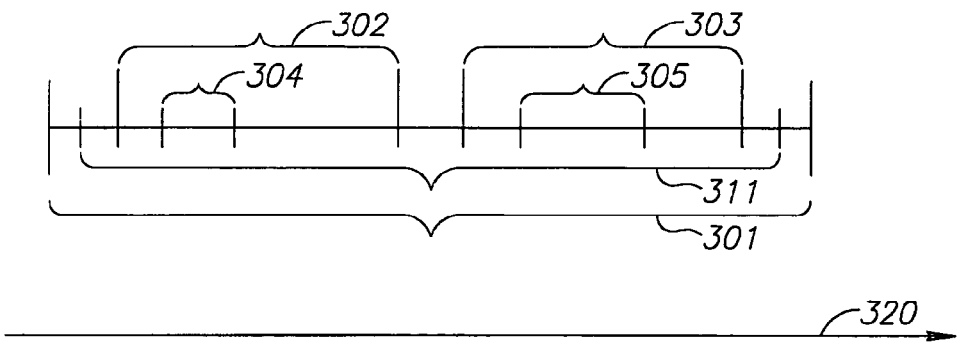
FIG. 3 is a schematic illustration of an exemplary timing diagram of transmissions within a wireless communication system in accordance with some embodiments of the invention.
Figure 3:
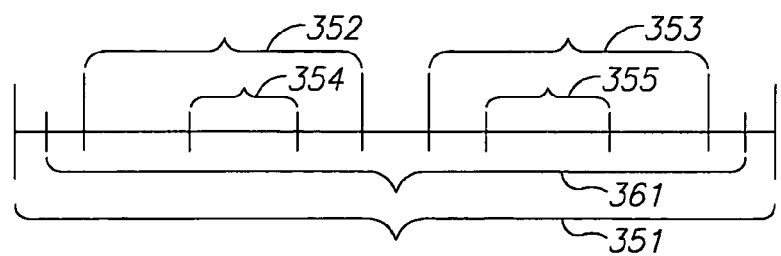

FIG. 3 schematically illustrates an exemplary timing diagram of transmissions within a wireless communication system according to some embodiments of the invention. Horizontal axis 320 may indicate a time line. In an exemplary embodiment, station 101 may transmit a first signal during a time interval 301, and station 102 may transmit a second signal during a time interval 351. Time intervals 301 and 351 may overlap partially or completely. In the example shown in FIG. 3, time interval 301 begins before time interval 351 begins, and time interval 301 ends before time interval 351 ends. However, the scope of the present invention is not limited in this respect, and in various embodiments time interval 301 may begin and/or end before, after and/or substantially simultaneously with time interval 351.

In accordance with some embodiments of the invention, transmission of the first signal may include a transmission of a data block during time interval 311. The data block may be transmitted in one or more slots, for example, slots 302 and 303. Slots 302 and 303 may be transmitted by station 101 at different times and/or over different frequencies. Transmission of slots 302 and 303 may include transmission of training sequences 304 and 305, respectively. Training sequence 304 and/or 305 may include a sequence of symbols, for example, 26 symbols, which may be known to station 103. Training sequence 304 and/or 305 may include, for example, a training sequence selected from a plurality of pre-defined training sequences.

Similarly, transmission of the second signal may include a transmission of a data block during time interval 361. The data block may be transmitted in one or more slots, for example, slots 352 and 353. Slots 352 and 353 may be transmitted by station 102 at different times and/or over different frequencies. Transmission of slots 352 and 353 may include transmission of training sequences 354 and 355, respectively. Training sequence 354 and/or 355 may include a sequence of symbols, for example, 26 symbols, which may be known to station 103. Training sequence 354 and/or 355 may include, for example, a training sequence selected from a plurality of pre-defined training sequences.

In accordance with some embodiments of the invention, training sequences 304, 305, 354 and/or 355 may be identical, similar, or different. In some embodiments, this may occur, for example, because training sequences 304, 305, 354 and/or 355 may be selected from a plurality of pre-defined training sequences, as are known in the art.

In some embodiments, the transmission time of one or more data blocks of signal 301 may overlap, or partially overlap, the transmission time of one or more data blocks of signal 351. In the example shown in FIG. 3, the transmission time of data block 311 of signal 301 partially overlaps the transmission time of data block 361 of signal 351.

Similarly, in some embodiments, the transmission time of one or more slots of signal 301 may overlap, or partially overlap, the transmission time of one or more slots of signal 351. In the example shown in FIG. 3, the transmission time of slot 302 of signal 301 partially overlaps the transmission time of slot 352 of signal 351.

Furthermore, in some embodiments, the transmission time of one or more training sequences of signal 301 may overlap, or partially overlap, the transmission time of one or more training sequences of signal 351. In the example shown in FIG. 3, the transmission time of training sequence 305 of signal 301 partially overlaps the transmission time of training sequence 355 of signal 351, while the transmission time of training sequence 304 of signal 301 does not overlap the transmission time of training sequence 354 of signal 351.

In some embodiments, CCI may exist between signals 301 and 351, or between portions of signals 301 and 351. For example, CCI may exist between data block 361 of signal 351 and data block 311 of signal 301. Similarly, for example, CCI may exist between slot 303 of signal 301 and slot 353 of signal 351, and/or between training sequence 305 of signal 301 and training sequence 355 of signal 351.

In one embodiment, for example, high CCI may exist if training sequence 305 is substantially identical or similar to training sequence 355 and there is no delay or a short delay, for example, three or four symbols, between training sequence 305 and training sequence 355. Additionally, high CCI may exist if the power of received signal 351 is high, for example, if the power of received signal 351 is at least 10 percent, 12.5 percent, 20 percent or 50 percent of the power of received signal 301. Other percentage values or threshold values may be used in accordance with embodiments of the invention, for example, percentage values or threshold values derived from a testing or a simulation of a specific implementation of a wireless communication system. Such exemplary types of CCI may be estimated, detected and/or handled in accordance with embodiments of the invention.

Figure 4:
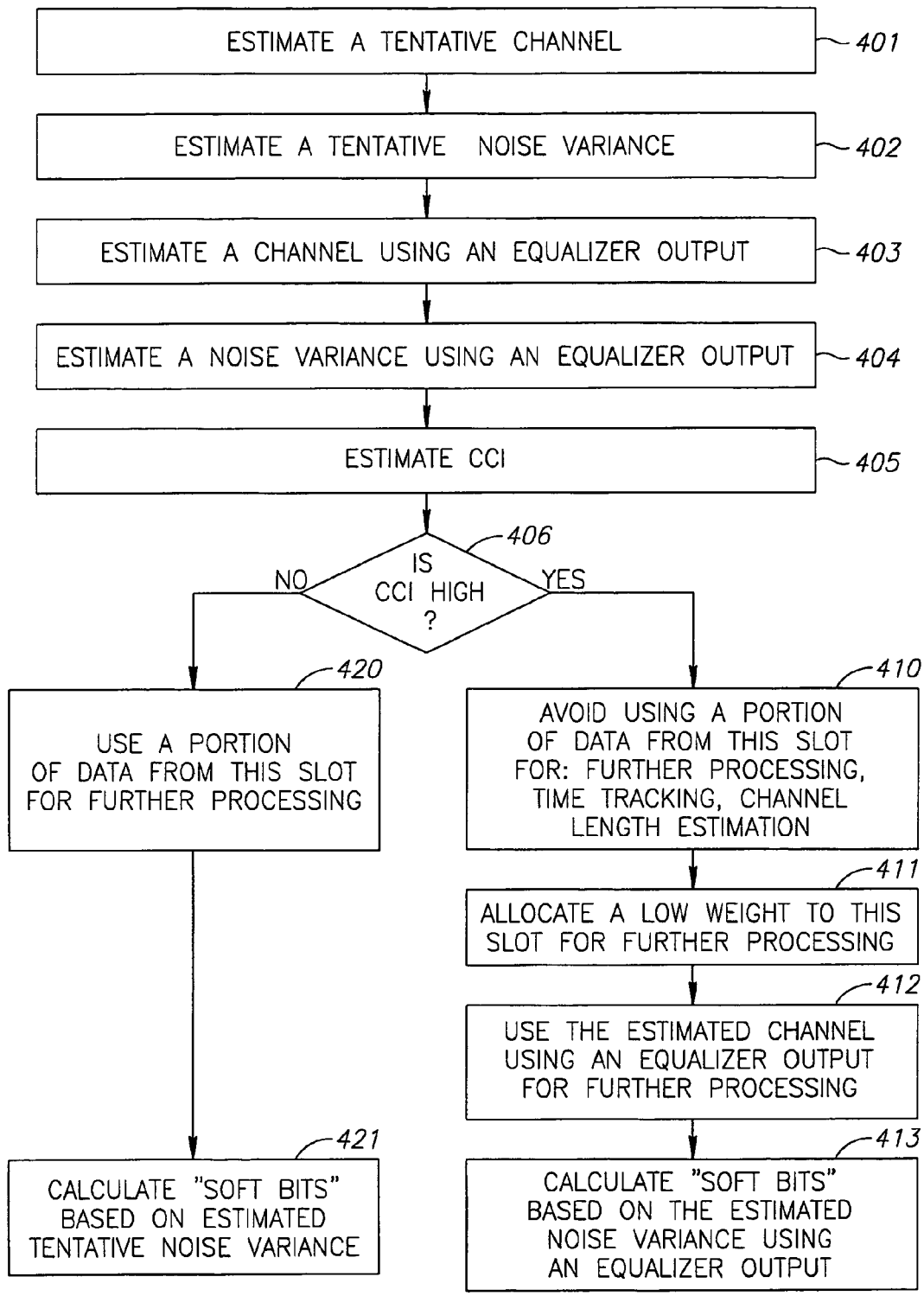
FIG. 4 is a schematic flow-chart of a method of detecting and handling cross-correlation between co-channel interference and a signal in accordance with exemplary embodiments of the invention.

FIG. 4 is a schematic flow-chart of a method of estimating, detecting and handling CCI in accordance with exemplary embodiments of the invention. The method may be used, for example, by one or more of wireless station 101, 102 and 103 of communication system 100 of FIG. 1, by station 200 of FIG. 2, or by any other suitable wireless communication devices, stations, systems and/or networks. In one embodiment, for example, the method may be used by station 103 upon or during reception of a signal, for example, the method may be initiated upon reception of the first signal during time interval 301 of FIG. 3.

As indicated at block 401, the method may begin by estimating a channel based on training sequence 304 of signal 301. The channel estimation may be performed, for example, using one or more suitable methods, operations, algorithms and/or calculations, as are known in the art. The result of this operation may be referred to as "estimated tentative channel", and may be denoted $H_t$. In one embodiment, the estimated tentative channel may include, for example, one or more complex number values, which may describe the channel or one or more taps or properties of the channel.

As indicated at block 402, the method may estimate a noise variance based on training sequence 304 of signal 301. The noise variance estimation may be performed, for example, using one or more suitable methods, operations, algorithms and/or calculations, as are known in the art. The result of this operation may be referred to as "estimated tentative noise variance", and may be denoted $N_t$. In one embodiment, the estimated tentative noise variance may include, for example, a real number value, which may represent a noise power level or one or more noise-related properties.

As indicated at block 403, the method may proceed by estimating a channel based on an equalizer output, for example, based on an output of equalizer 204. This estimation may be performed, for example, using one or more suitable methods, operations, algorithms and/or calculations, as are known in the art. For example, this estimation may be performed by station 103 based on one or more symbols, which may be included in signal 301 but may not be included in training sequence 304. The result of this operation may be referred to as "estimated channel using equalizer output", and may be denoted $H_e$. In one embodiment, the estimated channel using equalizer output may include, for example, one or more complex number values, which may describe the channel or one or more taps or properties of the channel based on equalizer output.

It is noted that in some embodiments, for example, estimation of the estimated channel using equalizer output may be performed by station 103 using, or in conjunction with, one or more suitable methods, operations, algorithms and/or calculations for channel tracking, as are known in the art. For example, in one embodiment, estimation of the estimated channel using equalizer output may be performed using a Least Mean Square (LMS) algorithm and/or a Recursive Least Square (RLS) algorithm, as are known in the art.

As indicated at block 404, the method may estimate a noise variance based on an equalizer output, for example, based on an output of equalizer 204. This estimation may be performed, for example, using one or more suitable methods, operations, algorithms and/or calculations, as are known in the art. The estimation may be performed, for example, by station 103 based on one or more symbols, which may be included in signal 301 but may not be included in training sequence 304. The result of this operation may be referred to as "estimated noise variance using equalizer output", and may be denoted Ne. In one embodiment, the estimated noise variance using equalizer output may include, for example, a real number value, which may represent a noise power level or one or more noise-related properties based on equalizer output.

It is noted that in one embodiment, for example, estimation of the estimated noise variance using equalizer output may take into account, for example, a distance between received signal 301 and an estimated maximum likelihood sequence convolved with the estimated channel, which may be calculated using one or more suitable methods, operations, algorithms and/or calculations, as are known in the art.

Upon performing these estimations, as indicated at block 405, the method may estimate a probability that a potential wireless communication station may transmit a first signal and thus create co-channel interference, which may be characterized by a high cross-correlation with a second signal. For example, in one embodiment, the method may estimate the probability that station 102 may transmit signal 351 and thus create CCI between signal 351 and signal 301 transmitted by station 101. In some embodiments, the method may estimate and/or determine a CCI, an existence or non-existence of CCI, and/or a probability that high CCI may exist.

In some embodiments, the estimation of CCI indicated at block 405 may include, for example, comparing the estimated tentative channel to the estimated channel using equalizer output. Additionally or alternatively, the estimation of CCI indicated at block 405 may include, for example, comparing the estimated tentative noise variance to the estimated noise variance using equalizer output.

For example, in some embodiments, if the estimated noise variance using equalizer output is significantly larger than the estimated tentative channel, and the absolute value of a difference between the estimated channel using equalizer output and the estimated tentative channel is significantly large, then it may be estimated that entire signal 301 and/or slot 302 of signal 301 and/or training sequence 305 of signal 301 may be subject to a high CCI.

Similarly, in some embodiments, a high CCI may be estimated if the following two equations hold true:

$$N_e > N_t + C \quad (1)$$

$$\sum_i |He_i - Ht_i|^2 > D \quad (2)$$

wherein parameter $He_i$ may be an i'th tap of the estimated channel using equalizer output, parameter $Ht_i$ may be an i'th tap of the estimated tentative channel, and C and D may be, for example, positive constants. The values of C and/or D may be pre-determined and/or optimized, for example, based on simulations and/or based on the operation of system 100.

In alternate embodiments, a high CCI may be estimated if the following two equations hold true:

$$N_e/N_t > B \quad (3)$$

$$\frac{\sum_i |He_i - Ht_i|^2}{\sum_i |He_i|^2} > E \quad (4)$$

wherein B may be, for example, a positive constant greater than one, and E may be greater than zero. The values of B and/or E may be pre-determined and/or optimized, for example, based on simulations and/or based on the operation of system 100. For example, although the invention is in no way limited in this respect, in some embodiments, B may be equal to about 1.5 or about 2, and E may be equal to about 0.25 or about 0.5.

In some embodiments, the estimation of CCI indicated at block 405 may take into account various other suitable parameters, data, conditions and/or criteria, and may use various other suitable equations, formulas and/or functions. For example, in one embodiment, a difference between the estimated tentative channel and the estimated channel using equalizer output may result from channel fading; however, a channel fading may result in a graduate change in estimated channel taps, while CCI may result in a relatively abrupt change in estimated channel taps. This criterion may be taken into account while estimating CCI.

Based on the estimation of CCI, the method may select, as indicated at block 406, a suitable sequence of operations to process signal 301.

For example, as indicated at block 410, if the estimated CCI is high, then the method may avoid using one or more data items, portions or parameters of slot 302 and/or data block 311 for the purpose of time tracking, for the purpose of estimating a length of a channel of a subsequent slot, or for other purposes. Instead, as indicated at block 411, the method may use other suitable operations for such purposes. For example, in one embodiment, as indicated at block 411, the method may allocate a low weight, or a relatively low weight, to slot 301 when processing slots, e.g., slots 302 and 303, which correspond to data block 311. Additionally or alternatively, in some embodiments, as indicated at block 412, when processing data included in slot 301 to estimate a length of a channel of a subsequent slot, the method may use the estimated channel using equalizer output instead of using the estimated tentative channel.

Furthermore, as indicated at block 413, if the estimated CCI is high, then the method may use the estimated noise variance using equalizer output instead of using the estimated tentative noise variance for further processing operations, e.g., for calculating "soft bits". In one embodiment, for example, the method may calculate "soft bits" based on the estimated noise variance using equalizer output, $N_e$, or based on the sum of the estimated noise variance using equalizer output, $N_e$, and a positive constant, K. The value of K may be pre-determined and/or optimized, for example, based on simulations and/or operations of system 100.

Referring back to the selection indicated at block 406, alternatively, if it is estimated that CCI is not high, then, as indicated at block 420, the method may use one or more data items, portions or parameters of slot 301 for the purpose of time tracking, or for the purpose of estimating a length of a channel of a subsequent slot.

Furthermore, as indicated at block 421, if the estimated CCI is low, then the method may use the estimated tentative noise variance for further processing operations, e.g., for calculating "soft bits". In one embodiment, for example, the method may calculate "soft bits" based on the estimated tentative noise variance.

Other suitable processing operations may be performed, and other suitable parameters and data may be used, in performing further processing operations based on the estimation of CCI.

Although some embodiments of the invention may be used in conjunction with system 100, it should be appreciated that embodiments of the invention may be used, for example, to detect and/or handle CCI in conjunction with various other suitable networks, systems, scenarios and/or devices. For example, the method of FIG. 4 and/or other suitable methods in accordance with embodiments of the invention may be used to detect and/or handle CCI created by a single wireless communication station which may transmit a signal in two or more directions. In one embodiment, for example, station 101 may transmit a signal in two directions using two directional antennas, thus creating CCI between the two directional transmissions; such CCI may be detected and/or handled, e.g., by station 103, using the method of FIG. 3 and/or other suitable methods in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors, or devices as are known in the art. Some embodiments of the invention may include buffers, registers, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by station 200, by processor 201, by estimator 210, by calculator 220, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 202), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving first and second signals on a channel from first and second respective transmitters;
estimating the co-channel interference between the first and second signals;
receiving a signal including a data block over said channel from one of said first and second transmitters;
estimating a cross-correlation between said co-channel interference and said received signal; and
handling said received data block using a processor of a station where said handling is based on said estimation of cross-correlation between the co-channel interference and the received signal, wherein handling said data block comprises avoiding using a portion of said data block if the estimated cross-correlation between said co-channel interference and said received signal is high.

2. The method of claim 1, comprising processing said data block based on an estimated channel using an equalizer output if the estimated cross-correlation between co-channel interference and the received signal is high.

3. The method of claim 1, comprising calculating a soft bit based on an estimated noise variance using an equalizer output if the estimated cross-correlation between co-channel interference and the received signal is high.

4. The method of claim 1, wherein estimating the cross-correlation between co-channel interference and the received signal comprises comparing an estimated tentative channel to an estimated channel using an equalizer output.

5. The method of claim 1, wherein estimating the cross-correlation between co-channel interference and the received signal comprises comparing an estimated tentative noise variance to an estimated noise variance using an equalizer output.

6. The method of claim 1, wherein avoiding using said portion of said data block comprises time tracking and/or channel length estimation of said portion of said data block to be avoided.

7. An apparatus comprising:
an estimator to estimate co-channel interference between first and second signals received from respective first and second transmitters on a channel, to estimate correlation between said co-channel interference and a signal received from one of said first and second transmitters, and to handle a data block of said received signal based on said estimation of cross-correlation between co-channel interference and the received signal, wherein said estimator is to handle said data block by avoiding using a portion of said data block if said estimated cross-correlation between said co-channel interference and said received signal is high.

8. The apparatus of claim 7, wherein the estimator is able to process said data block based on an estimated channel using an equalizer output if the estimated cross-correlation between co-channel interference and the received signal is high.

9. The apparatus of claim 7, wherein the estimator is able to calculate a soft bit based on an estimated noise variance using an equalizer output if the estimated cross-correlation between co-channel interference and the received signal is high.

10. The apparatus of claim 7, wherein the estimator is able to estimate the cross-correlation between co-channel interference and the received signal.

11. The apparatus of claim 10, wherein the estimator is able to compare an estimated tentative channel to an estimated channel using an equalizer output.

12. The apparatus of claim 10, wherein the estimator is able to compare an estimated tentative noise variance to an estimated noise variance using an equalizer output.

13. The apparatus of claim 7, wherein the estimator is a processor.

14. The apparatus of claim 7, wherein said estimator is to avoid using said portion of said data block by time tracking and/or channel length estimation of said portion of said data block to be avoided.

15. A wireless communication station comprising:
a dipole antenna to receive wireless communication signals; and
an estimator to estimate co-channel interference between first and second signals received from respective first and second transmitters on a channel, to estimate correlation between said co-channel interference and a signal received from one of said first and second transmitters, and to handle a data block of said received signal based on said estimation of cross-correlation between co-channel interference and the received signal, wherein said estimator is to handle said data block by avoiding using a portion of said data block if said estimated cross-correlation between said co-channel interference and said received signal is high.

16. The wireless communication station of claim 15, wherein the estimator is able to process said data block based on an estimated channel using an equalizer output if the estimated cross-correlation between co-channel interference and the received signal is high.

17. The wireless communication station of claim 15, wherein said estimator is to avoid using said portion of said data block by time tracking and/or channel length estimation of said portion of said data block to be avoided.

18. A wireless communication system comprising:
a first wireless communication station to transmit a first signal over a channel;
a second wireless communication station to transmit a second signal over said channel; and
a third wireless communication station to receive first and second signals from said first and second respective wireless communication stations, estimate the co-channel interference between the first and second signals, receiving a signal including a data block over said channel from one of said first and second wireless communication stations, estimate a cross-correlation between said co-channel interference and said received signal, and handle the data block based on the estimated cross-correlation between co-channel interference and the first signal, wherein said third wireless communication station is to handle said data block by avoiding using a portion of said data block if said estimated cross-correlation between said co-channel interference and said received signal is high.

19. The wireless communication system of claim 18, wherein the third wireless communication station is able to process said data block based on an estimated channel using equalizer output if said estimated cross-correlation between co-channel interference and the first signal is high.

20. The wireless communication system of claim 18, wherein said third wireless communication station is to avoid using said portion of said data block by time tracking and/or channel length estimation of said portion of said data block to be avoided.

* * * * *